March 11, 1941. E. L. BLACKBURN 2,234,537
BELT CONVEYER
Filed March 22, 1940 2 Sheets-Sheet 1
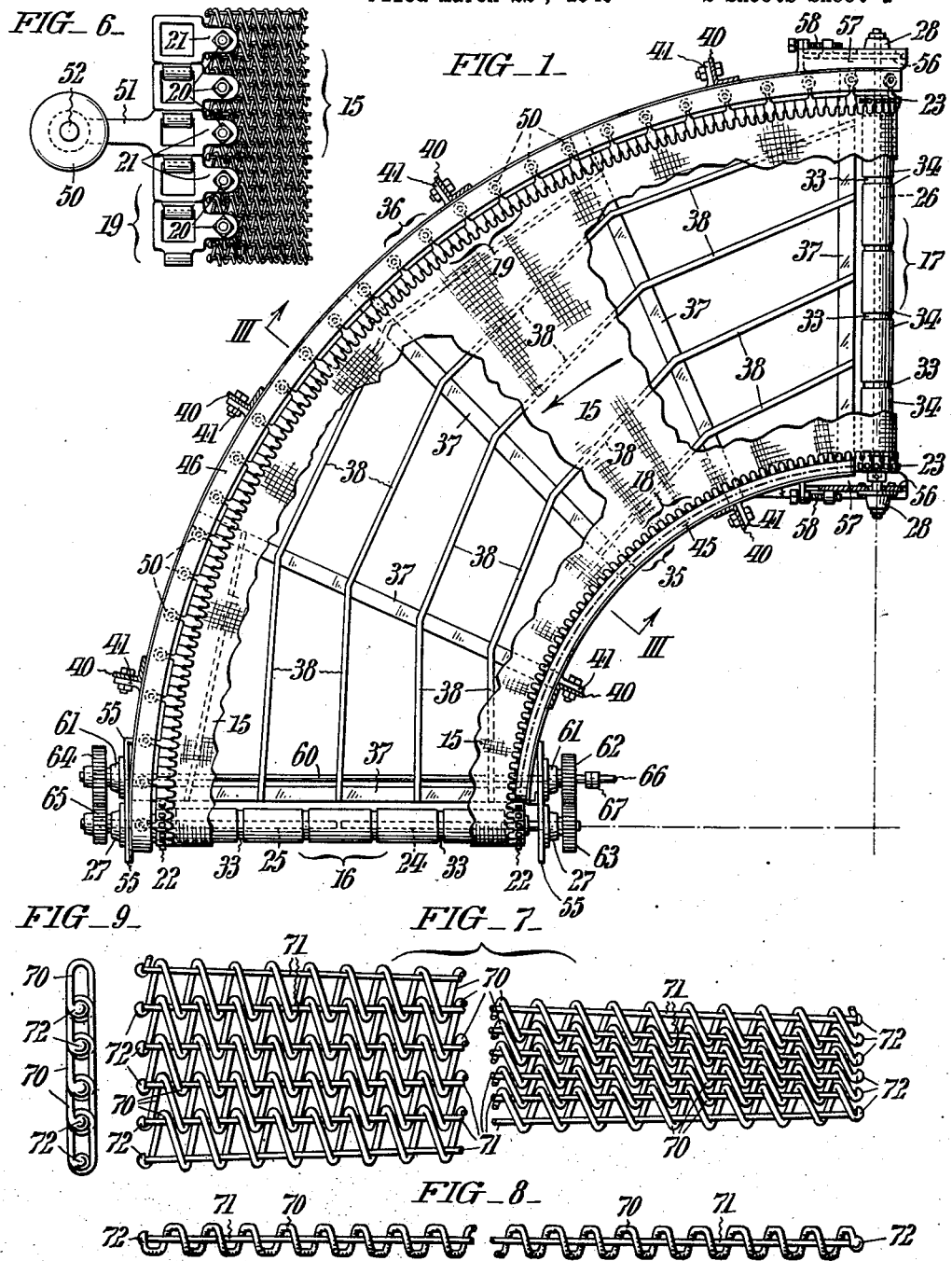
INVENTOR:
Ernest Linwood Blackburn
BY Paul & Paul
ATTORNEYS.

March 11, 1941. E. L. BLACKBURN 2,234,537
BELT CONVEYER
Filed March 22, 1940 2 Sheets-Sheet 2
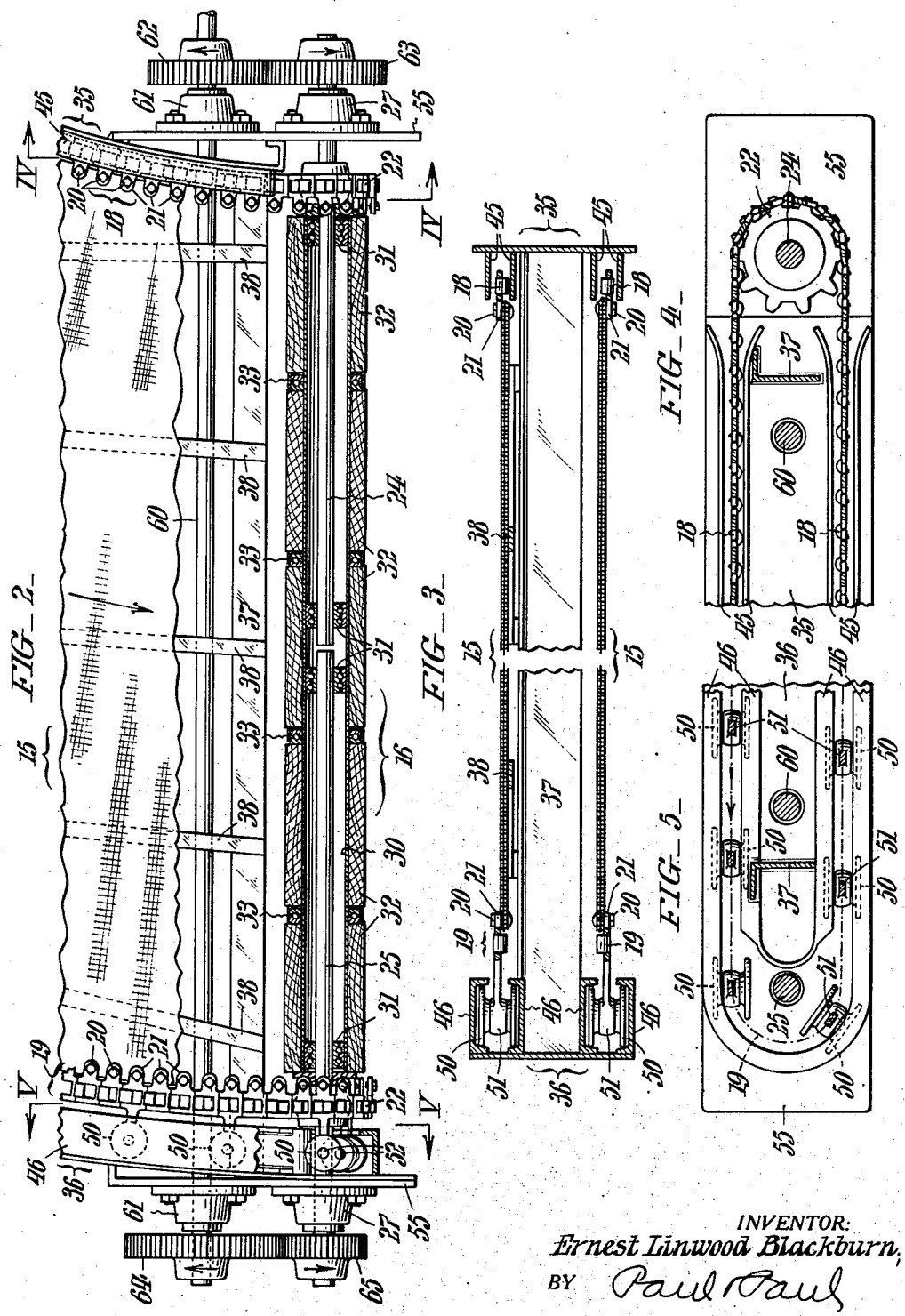
INVENTOR:
Ernest Linwood Blackburn,
BY Paul & Paul
ATTORNEYS.

Patented Mar. 11, 1941

2,234,537

UNITED STATES PATENT OFFICE 2,234,537

BELT CONVEYER

Ernest Linwood Blackburn, Haddon Heights, N. J., assignor to Korb-Pettit Wire Fabrics & Iron Works, Inc., Philadelphia, Pa., a corporation of Pennsylvania Application March 22, 1940, Serial No. 325,302

11 Claims. (Cl. 198—182)

This invention relates to belt conveyers, and especially belts making a lateral, edgewise bend, or travelling in a laterally or horizontally curved path. I aim to provide a simple, efficient conveyer of this character, capable of sustaining heavy loads, if required, without sagging, and adaptable (when built of suitable materials) for carrying loads that are warm or hot. I also aim to avoid the necessity of employing conical guides or pulleys at the vertical bends of the belt between its upper and lower runs. Other features and advantages of the invention will appear from the following description of a species and form of embodiment, and from the drawings. All the features and combinations illustrated or described are of my invention, so far as novel.

In the drawings, Fig. 1 is a general plan view of a belt conveyer conveniently embodying the invention, certain portions of the belt being broken out to reveal underlying structure; Fig. 2 is a fragmentary plan view of one end of the conveyer and the associated parts, on a larger scale than Fig. 1, part of the belt being broken out and certain parts being broken away and in horizontal section; Fig. 3 is a fragmentary sectional view on a still larger scale, the section being taken as indicated by the line and arrows III—III in Fig. 1; Figs. 4 and 5 are fragmentary elevational views, taken as indicated by the lines and arrows IV—IV and V—V in Fig. 2, with certain parts in vertical section; and Fig. 6 is a fragmentary plan view of a portion of the belt and an associated sprocket chain, with a guide roller device attached to one of the sprocket links.

Fig. 7 is a fragmentary plan view illustrating one form of construction for a conveyer belt when made of wire, the outer and inner margins of a segment of the belt being shown, and its intermediate portion broken out and omitted; Fig. 8 is a corresponding edge view from the bottom of Fig. 7; and Fig. 9 is a view of the outer edge of the belt segment, from the left of Fig. 7.

In Fig. 1, the endless flexible conveyer belt 15 is shown as making a lateral, edgewise bend, and as travelling in a curved path amounting to a 90° segment of a circle, although the angular extent of the path might of course be either greater or less than this. For guiding the belt 15 around the vertical bends between its upper, load-carrying run and its parallel adjacent oppositely-moving lower idle run, there are guides 16, 17 arranged at an angle to one another corresponding to the change of direction in the belt runs. These guides 16, 17 are shown as of uniform size throughout the width of the belt 15, and as cylindrical. The portions of the belt 15 at the inside and at the outside of its curved path of travel comprise flexible cables 18, 19, shown as sprocket chains, which serve for driving it and also assist in keeping it taut or stretched to sustain its load without sagging. As shown, these chains 18, 19 are secured to the outer and inner edges of the belt 15, with which they travel, by means of fastenings such as bolts 20 taken through ears 21 on the chain links, as well as through the belt.

The cables 18, 19 extend around rotors or sprocket wheels 22, 23 whose teeth interlock with the sprocket links, and these rotors 22, 23 are mounted substantially coaxially with the guides 16, 17, the rotors 22 being fast on separate shaft sections 24, 25, and the rotors 23 being free to turn on a common shaft 26. The shaft sections 24, 25 are mounted in bearings 27 at one end of the machine frame, and the shaft 26 in bearings 28 at the other end of the frame. As shown in Fig. 2, the shaft sections 24, 25 extend inward toward one another inside a sleeve 30, through anti-friction bearings 31 mounted in said sleeve. The sleeve 30 carries the belt-guide 16, consisting as shown of short cylinder or roller sections 32 of suitable material (such as wood) which are loose around the sleeve 30, with anti-friction thrust bearings 33 between them. Thus the roller sections 32 are free to turn on the sleeve 30 independently, at different angular velocities corresponding to the (average) linear velocities of the portions of the belt 15 that run over them. The roller sections 34 forming the belt-guide 17 may be similarly mounted around the shaft 26.

As shown in Fig. 1, the machine frame comprises side members 35, 36 at the inner and outer edges of the belt 15, curved in conformity to these edges, and interconnected by horizontal cross-braces 37 of angle-bar section. For supporting the upper loaded run of the conveyer belt 15, there are longitudinal bars 38 extending along on top of the cross-braces 37, from one to another, and welded or otherwise secured to the cross-braces. As shown, these longitudinals 38 slope (inward) somewhat across the direction of travel of the upper belt run, so that the friction of the belt 15 with them is substantially even across the width of the belt, rather than concentrated on narrow longitudinal strips, so as to wear the belt out locally. The frame and the whole machine may be supported (either from beneath or from above) by uprights 40 attached to the side members 35, 36, as by bolting them to brackets 41 welded to these side members.

As shown in Fig. 3, the frame members 35, 36 are of a channel-like section, comprising upright webs with horizontal flanges extending inward toward the belt 15 from the webs. These flanges are shown as separate bars with their edges welded to the inner sides of the webs, and there are four such flanges for each web plate. In the present instance, the flange-bars 45 of the inner frame member 35 are mere flat strips of metal, while the flange-bars 46 of the outer frame member 36 are themselves of channel section, and are arranged facing toward one another in upper and lower pairs. As shown in Fig. 3, the ends of the angle-bar cross-braces 37 are attached to the web plates of the side members 35, 36 between their upper and lower pairs of flanges 45, 45 and 46, 46. Besides strengthening the frame members 35, 36, their flange-bars 45, 46 also serve to sustain, guide, guard, and house the chains 18, 19 and associated parts, and to support the inner and outer edges of the belt 15,—as explained hereinafter.

For this purpose, as shown in Figs. 1, 2, 3, and 4, the links of the upper run of the inner chain 18 lie directly under the top bar 45 and rest on the horizontal ledge formed by the second bar, and the links of the lower chain run rest on the ledge formed by the bottom bar 45 directly under the bar next above. Near the shaft section 24, the ends of the upper pair of guide bars 45 are flared apart by bending them upward and downward, and likewise the ends of the lower pair.

For the purpose of guiding and sustaining the links of the outer sprocket chain 19 and the outer edges of the belt runs, and holding these edges of the belt 15 outward to their proper curved path, this sprocket chain 19 is provided at intervals with guide-rollers 50, 50 mounted at the upper and lower sides of short arms or outward extensions 51 on certain of the chain links and arranged to turn in the general plane of the belt about upright axes 52 in the outer ends of the arms, Figs. 1, 2, 3, 5 and 6. As shown in Figs. 1 and 2, each fourth link has a pair of such rollers 50. The rollers 50 pertaining to each run of the belt 15 coact with the corresponding curved guide bars 46, 46, whose (inner) guide flanges are turned (downward and upward) toward one another and engage inside the rollers 50 to hold the belt outward to its proper path. As shown in Figs. 1, 2, and 5, the top and bottom guide bars 46, 46 consist of one channel bar that makes a U-bend around the corresponding vertical bend of the belt and the shaft section 25, and its guide flange engages the rollers 50 as the chain 19 travels around its sprocket 22, 23. The intermediate guide bars 46 are similarly continuous in a U-bend behind the shaft section 25, though as shown their guide flanges are cut away at this bend.

As shown in Figs. 1 and 2, the bearings 27 for the shaft sections 24, 25 are mounted on plates 55 which are suitably attached to the corresponding ends of the frame sides 35, 36. Similarly, the bearings 28 for the shaft 26 are mounted on plates 56 whose upper and lower edges are mounted to slide in grooves in upper and lower brackets 57, 57 attached to the side members 35, 36 at this end of the frame. Adjusting screws 58 may be provided for adjusting the plates 56 and the bearings 28 to tighten or loosen the belt 15 and the chains 18, 19 as from time to time required.

For driving the conveyer belt 15, there is shown in Figs. 1 and 2 a drive shaft 60 arranged adjacent the belt guide 16, as here shown (see also Fig. 5), between the upper and lower runs of the belt 15. The bearings 61 for the shaft 60 may be mounted on the same plates 55 that carry the bearings 27 for the shaft sections 24, 25. The shaft sections 24, 25 are driven from the drive shaft 60 through sets or pairs of coacting gears 62, 63 and 64, 65, whose relative gear ratios correspond to the relative linear velocities of the chains 18 and 19. The gears 62 and 63 are fast on the right-hand end of the shaft 60 and the shaft section 24, respectively, while the gears 64, 65 are fast on the left-hand end of the shaft 60 and the shaft section 25, respectively. Thus the rotary driver sprockets 22 on the shaft sections 24, 25 are driven at different angular velocities corresponding to the different linear velocities of the driving cables 18, 19. In other words, the gear ratios of the coacting gears 62, 63 and 64, 65 are proportional to the linear velocities of the cables 18 and 19, and the shaft sections 24, 25 are, therefore, driven at angular velocities likewise proportional to the linear velocities of these cables 18, 19. The shaft 60 may be driven by any suitable means from any suitable source of power, here indicated by a shaft connection 66 coupled to the shaft 60 at 67. In the present instance, no provision is made for driving the rotors 23, 23 or the shaft 26.

As shown in Figs. 7, 8, and 9, the conveyer belt 15 is of wire construction, comprising a series of transverse flattened helical wire coils 70,—which as shown are all right-hand helics, and a series of associated transverse pivot wires 71. In the present instance, successive transverse coils 70 do not interlace through one another, but have their convolutions arranged in alternation and interconnected by the pivot wires 71. The transverse coils taper from the left-hand outer edge of the belt toward the right-hand inner edge, Fig. 7, so as to give the belt 15 its curvature as shown in Fig. 1. Each of the pivot wires 71 is shown in Fig. 7 as having its opposite ends fastened, by welds 72, to the ends of one of the helical coils 70, with which it coacts.

It will be understood that while this construction of the belt 15 is simple and satisfactory, yet other constructions might be used, if preferred for any reason, and that the invention is not in all aspects confined to wire or other metallic belts.

Having thus described my invention, I claim:

1. The combination of an endless conveyer belt with adjacent parallel oppositely moving runs making a lateral, edgewise bend, guides for the vertical bends of said belt from run to run arranged at an angle to one another corresponding to the change of direction in the belt runs, rotary drivers of like size in interlocking engagement with said belt at widely separate points in its width and arranged substantially coaxial with the guide for a vertical bend of said belt, and means for driving said rotary drivers at different angular velocities proportional to the different lengths of the portions of the belt which the respective drivers engage, so that the various portions of the belt across its width all traverse said vertical bend of the belt, as well as the edgewise-bent or curved belt runs themselves, at different linear velocities corresponding to their own different lengths.

2. The invention as set forth in claim 1 wherein the guide for a vertical bend of said belt from run to run comprises substantially coaxial sections of like size arranged to turn at different angular velocities corresponding to the different lengths of the portions of the belt that run over them.

3. The invention as set forth in claim 1 wherein the means for driving said rotary drivers comprises a drive shaft adjacent the same and a set of coacting gears for driving each rotary driver from said drive shaft, the relative gear ratios of said gear sets corresponding to the relative lengths of the portions of the belt that are engaged with the drivers driven by the respective gear sets.

4. The combination of an endless conveyer belt with adjacent parallel oppositely moving runs making a lateral, edgewise bend, guides for the vertical bends of said belt from run to run arranged at an angle to one another corresponding to the change of direction in the belt runs, driving cables attached to and travelling with the portions of the belt at the inside and at the outside of its curved path, rotary drivers of like size in interlocking engagement with said cables and arranged substantially coaxial with the guide for a vertical bend of said belt, and means for driving said rotary drivers at different angular velocities proportional to the different lengths of the said driving cables, so that said cables and the various portions of the belt across its width all traverse said vertical bend of the belt, as well as the edgewise-bent or curved belt runs themselves, at different linear velocities corresponding to their own different lengths.

5. The invention as set forth in claim 4 wherein each of the guides for the vertical bends of said belt from run to run comprises a number of substantially coaxial cylindrical sections free to turn independently at different angular velocities substantially corresponding to the different linear velocities of the portions of the belt that run over them.

6. The combination of an endless conveyer belt with adjacent parallel oppositely moving runs making a lateral, edgewise bend, guides for the vertical bends of said belt from run to run arranged at an angle to one another corresponding to the change of direction in the belt runs, driving cables attached to and travelling with the portions of the belt at the inside and at the outside of its curved path, rotary drivers of like size in interlocking engagement with said cables and arranged substantially coaxial with the guide for a vertical bend of said belt, a drive shaft for said rotary drivers adjacent said guide means and the associated drivers, and a set of coacting gears for driving each of said rotary drivers from said drive shaft, the relative gear ratios of said gear sets being proportional to the relative lengths of the cables driven by the corresponding rotary drivers, so that said cables and the various portions of the belt across its width all traverse said vertical bend of the belt, as well as the edgewise-bent or curved belt runs themselves, at different linear velocities corresponding to their own different lengths.

7. The combination with an endless conveyer belt having adjacent parallel oppositely-moving runs making a lateral, edgewise bend, and means for driving said belt and for guiding it around its vertical bends from run to run, of pairs of coaxial guide-rollers attached to the edge of said belt that lies at the outside of the edgewise bend and revoluble in the general plane of the belt, and a pair of guide-bars lying at opposite sides of the pairs of rollers attached to a belt-run and having guide-flanges turned toward one another and engaging inside the rollers to hold the belt outward to its proper curved path.

8. The combination with an endless conveyer belt having adjacent parallel oppositely-moving runs making a lateral, edgewise bend, and means for driving said belt and for guiding it around its vertical bends from run to run, of guide-rollers attached to the edge of said belt that lies at the outside of the edgewise bend and revoluble in the general plane of the belt, and channel bars extending along the outer edges of the belt runs, outside their rollers, with their flanges extending inward above and below the rollers attached to the upper and lower runs, respectively, said channel flanges having along their inner edges guide-flanges turned toward one another and engaging inside the rollers to hold the belt runs outward to the proper curved path.

9. The combination with an endless conveyer belt having adjacent parallel oppositely-moving runs making a lateral, edgewise bend, and means for driving said belt and for guiding it around its vertical bends from run to run, of guide-rollers attached to the edge of said belt that lies at the outside of the edgewise bend and revoluble in the general plane of the belt, and a guide bar for said guide rollers bent vertically around a vertical bend of the belt from run to run and extending along above and below the rollers attached to the upper and lower belt runs, respectively, and having along its inner edge a guide flange substantially continuous around said bend of said bar and engaging inside the rollers to hold the belt outward to its proper path, both along the runs and in transition from run to run.

10. The combination with an endless conveyer belt having adjacent parallel oppositely-moving runs making a lateral, edgewise bend; and a supporting frame for said guide and driving means comprising side members at the inner and outer edges of the belt runs supporting said edges; of longitudinal supports for the upper, load-carrying belt run carried by said frame and extending lengthwise of said belt run on a slope across the direction of travel of said run, so that friction of said belt run with said supports is distributed across the width of the belt.

11. The combination of an endless conveyer belt having adjacent parallel oppositely moving runs making a lateral, edgewise bend, and comprising a series of wire coils extending transversely of the belt and tapered from the belt edge at the outside of its curved path to the inner edge, and a series of transverse pivot wires interconnecting said coils, a sprocket chain attached to and travelling with the edge of the belt at the outside of its curved path, a sprocket chain attached to and travelling with the portion of the belt toward the inside of said curved path, guides for the vertical bends of said belt from run to run arranged at an angle to one another corresponding to the change of direction in the belt runs and each comprising a number of substantially coaxial cylindrical sections free to turn independently with the movement of the belt, sprockets for said sprocket chains arranged substantially coaxial with the guides for a vertical bend of said belt, and of like size, and means for driving said sprockets at different angular velocities proportional to the different lengths of the said sprocket chains, so that said cables and the various portions of the belt across its widths all traverse said vertical bend of the belt, as well as the edgewise-bent or curved belt runs themselves, at different linear velocities corresponding to their own different lengths.

ERNEST LINWOOD BLACKBURN.